Patented Mar. 11, 1924.

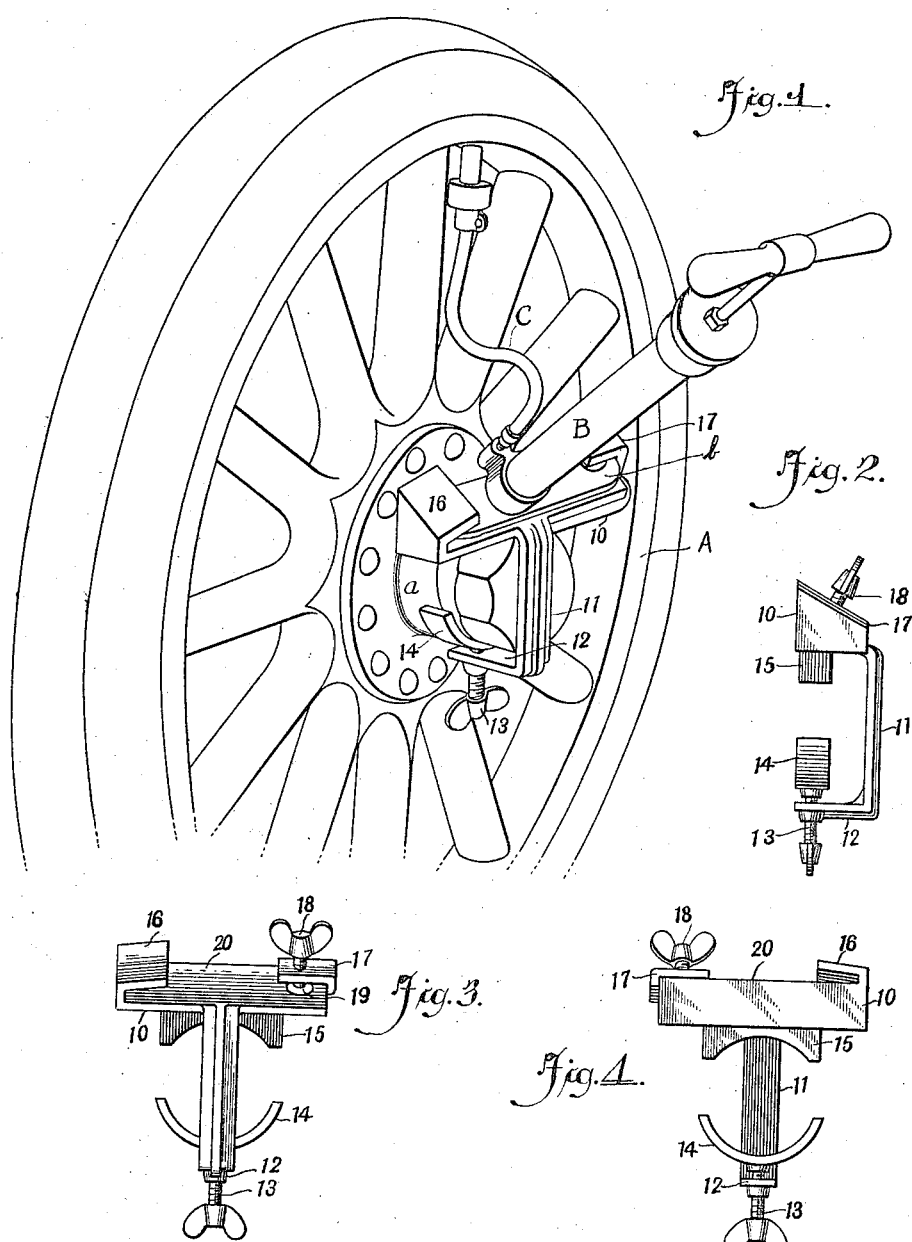

1,486,798

UNITED STATES PATENT OFFICE.

VOLNIE GLAZE REED, OF OSMOND, NEBRASKA.

PUMP-SUPPORTING ATTACHMENT FOR VEHICLES.

Application filed March 13, 1923. Serial No. 624,783.

*To all whom it may concern:*

Be it known that I, VOLNIE GLAZE REED, a citizen of the United States of America, and a resident of Osmond, in the county of Pierce and State of Nebraska, have invented a new and Improved Pump-Supporting Attachment for Vehicles, of which the following is a description.

My invention relates to means for supporting a pump on a vehicle wheel and particularly to an attachment to be applied to the hub of a wheel.

The general object of my invention is to provide a pump holding attachment of simple construction that can be quickly applied to a wheel by even a child or unskillful person and which will firmly support the pump in position for its most convenient manual operation.

The nature of the invention and its distinguishing features and advantages will clearly appear as the description proceeds.

Reference is to be had to the accompanying drawings forming a part of this specification, it being understood that the drawings are merely illustrative of one example of the invention.

Figure 1 is a perspective view of a pump supporting attachment embodying my invention showing the same in use on a wheel;

Figure 2 is a side elevation of the attachment;

Figure 3 is a front elevation thereof;

Figure 4 is a rear elevation thereof.

In carrying out my invention in accordance with the illustrated example the attachment is provided with a transverse head 10 supported on the upper end of a yoke 11, the lower end 12 of which is directed laterally inward and receives a vertical clamp screw 13. The screw 13 is provided with a curved clamp element 14 adapted to coact with a depending clamp member 15 on the under side of the head 10, said member presenting a concave under surface.

On the transverse head 10 clamp means are provided for holding a pump. Said means advantageously consists of a rigid inclined member 14 overhanging the top of the head 10 at one end of the latter and a coacting loose clamp element 17 of L-shape through which a screw 18 passes, said screw being tapped into the upper surface of the head 10 adjacent the end opposite to that at which the member 16 is located. The upper surface 20 of the head 10 is inclined and constitutes a seat for the base *b* of a pump B the ends of which base are adapted to be received beneath the base retaining members 16, 17.

With the above described construction the clamp consisting of the members 14, 15 are disposed respectively beneath and above the hub *a* of a wheel A, the tire of which is to be pumped up and the clamp screw 13 tightened to firmly bind the attachment on said hub. The pump base *b* is then placed on the seat 20 of head 10 and the screw 18 tightened. The pump will now be disposed at the proper angle for most convenient operation and with the pump connected with the tire valve by a hose *c* as in the usual manner, the tire of the wheel may be pumped up with the minimum expenditure of effort and at the least inconvenience to the operator.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. A pump supporting attachment for wheels comprising a transverse head forming a pump seat, a yoke supporting said head and adapted to be disposed with its lower end beneath the hub of a wheel, and coacting clamp means on the under side of said head and on said yoke at the lower end.

2. A pump supporting attachment for wheels comprising a head having an inclined upper surface constituting a seat for the base of a pump, and means to clamp said head on a wheel.

3. A pump supporting attachment for wheels comprising a head having an inclined upper surface constituting a seat for the base of a pump, and clamp elements adapted to be disposed diametrically opposite on a wheel hub for positioning said head on the wheel.

4. A pump supporting attachment for vehicle wheels, comprising a transverse head, a seat at the upper surface thereof to receive a pump base, means on said head at the ends to engage and retain the pump base, and clamp means to secure said head to a wheel hub.

5. A pump supporting attachment for vehicle wheels, comprising a yoke adapted to be applied to a wheel hub, a transverse head on said yoke at the top and presenting a top surface affording a seat for a pump base, a fixed element on said head at one end and overhanging said seat, and movable clamp means on said head at the opposite end for fastening the pump base in position.

6. A pump supporting attachment for wheels, comprising a transverse head forming a pump seat, a yoke carrying said head at its upper end, a vertically movable clamp element on said yoke at the lower end adapted to be disposed beneath a wheel hub, and a rigid coacting clamp member on said head at the under side.

VOLNIE GLAZE REED.